Feb. 21, 1967 A. FRONTERA PASCUAL 3,305,053
SYSTEM OF ACCELERATING AND BRAKING BY MEANS
OF A COMBINED PEDAL FOR AUTOMOBILES

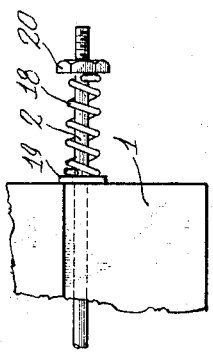
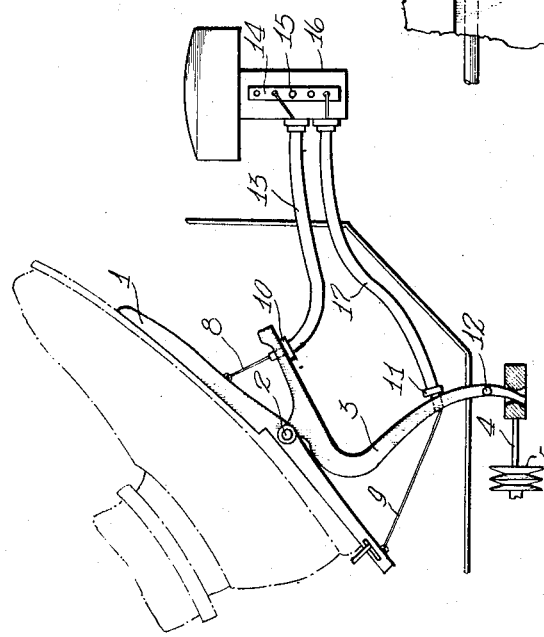

United States Patent Office 3,305,053
Patented Feb. 21, 1967

3,305,053
SYSTEM OF ACCELERATING AND BRAKING BY MEANS OF A COMBINED PEDAL FOR AUTOMOBILES
Antonio Frontera Pascual, Calle Francisco Sitjar 4, Palma de Mallorca, Spain
Filed Sept. 15, 1964, Ser. No. 396,638
3 Claims. (Cl. 192—3)

This invention relates to a combined accelerating and braking pedal system for automobiles.

As is well known, automobiles are at present provided with independent pedal means for operating the accelerator and the brake, both of these pedals being operated with the right foot of the driver, since the two functions are discordant and opposed and therefore it is compulsory to release one pedal before applying the other.

Time is, of course, required in order to shift the foot from one pedal to the other, the extent of such time depending upon the skillfulness and reflex of the driver. This time period, added to the braking period is of some consequence in determining the distance required to bring a vehicle to a stop, when such a stop is indicated. Thus, in some instances, this time period may represent the distance between an accident and the avoidance of same.

It is an object of this invention to provide a combined accelerating and braking pedal system for automobiles wherein the time period involved in shifting from one pedal to another is eliminated in a simple and effective manner and wherein no undesirable interference with the accelerating and braking operation occurs.

In accordance with the invention there is provided a pivotally mounted brake operated lever having a normally horizontal pivotal axis, such lever having a first arm extending downwardly from the axis and a second arm extending upwardly from the axis. The first arm is engageable with a brake operating connection. The second arm has a lower portion extending rearwardly from the axis and an upper portion extending upwardly and forwardly from the lower portion. A pedal is pivotally mounted on the upper portion and a throttle connection is secured to each of upper and lower portions of the pedal.

Figure 1:
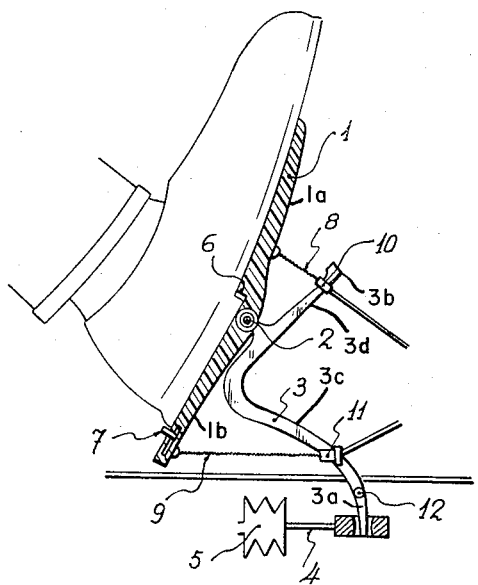
Figure 2:
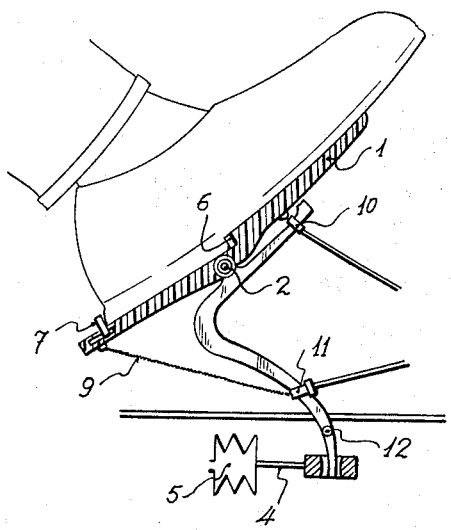
Figure 3:
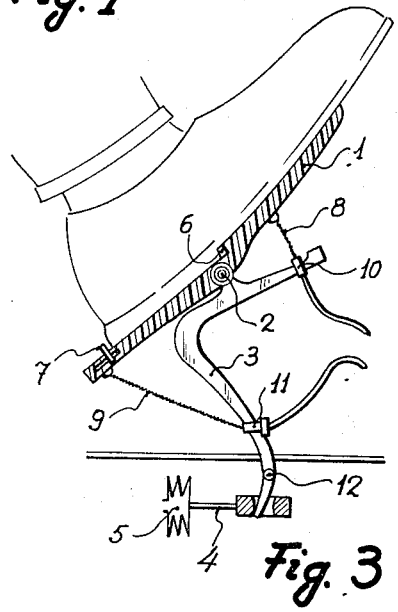

The invention will be described with reference to the accompanying drawing which illustrates one embodiment of the invention by way of example and in which FIGURE 1 is a side elevation of a pedal system in accordance with the invention in a rest position, FIGURE 2 is a side elevation showing the pedal in accelerating position, FIGURE 3 is a side elevation showing the pedal in braking position, FIGURE 4 is a side elevation illustrating a throttle connection means, and FIGURE 5 is a partial end elevation showing a turning resistance means for a pedal pivot pin.

Referring to the drawing, 1 is a pedal pivotally mounted on a pivot pin 2 carried by a brake operating lever 3. The pedal is provided with a transversely extending fixed shoulder 6 and an adjustable shoulder 7 in opposed relation to the fixed shoulder. As indicated, the heel of the driver is adapted to be placed between the two shoulders. As shown, the pivot pin 2 is located below the heel-receiving area of the pedal.

The lever 3 is pivotally mounted at 12 on a fixed frame part of the vehicle. The lever has a downwardly extending arm 3a having a sliding pivotal connection with a brake applying member 4 connected to a conventional braking device 5.

The lever has an upwardly extending arm 3b, such arm having a lower rearwardly extending portion 3c and an upper portion 3d extending upwardly and forwardly from the portion 3c. As shown, the pivot pin 2 is carried by portion 3d.

The pedal is provided with throttle operating connections comprising a connection 8 such as a strand or cable extending from an upper portion 1a of the pedal above pivot pin 2 and a connection such as a strand or cable 9 extending from the lower portion 1b of the pedal below pivot pin 2. As shown in FIGURE 4, the strand 8 extends through a bracket 10 on the upper end of lever portion 3d and through a tube 13 to a bar 14 fixed to the throttle operating spindle 15 of a carburetor 16. The strand 9 extends through a bracket 11 mounted on the lower end of lever portion 3c and through a tube 17 for connection to bar 14. It will be observed that the points of connection of the strands 8 and 9 to bar 14 are diametrically opposite whereby a pull on one of the strands with release of the other strand will result in rotating movement of the spindle 15.

It will be observed that portion 1b of the pedal constitutes the section thereof engageable by the heel of the operator's foot and that portion 1a constitutes the section thereof engageable by the forward sole portion of the operator's foot.

It is desirable that the pivotal movement of the pedal 1 have some degree of resistance whereby the driver will have more accurate control of the pivotal movement of the pedal. Moreover, it is desirable that such turning resistance be subject to adjustment to suit individual drivers. Any conventional means may be provided for this purpose and one such means is illustrated in FIGURE 5 wherein the pivot pin 2 is provided with a coil spring 18 disposed between a washer 19 engaging the pedal and an adjustable nut 20 on the pin.

It will be observed that in order to perform the acceleration step it is only necessary to swing, by means of the driver's foot, the pedal 1 on the axis 2 in clockwise direction without applying a pushing action on the lever 3. For deceleration, a reverse action is required.

To conduct a braking step it is only necessary to exert a forward pushing action on the pedal with the heel. It will be observed that this pushing action will also result in a deceleration step.

With the pedal in accelerating position, it is still possible to brake with effectiveness even though the pedal is bodily pushed forward, that is with all the pushing force exerted on the pivot pin 2, since when the lever 3 is pushed forward, the pedal 1 swings in a decelerating direction because of the normal turning of the foot on its hinge. The braking action is therefore accomplished simultaneously with deceleration, that is in accordance with normal practice when a driver's foot is shifted from one pedal to the other.

A practical advantage of the invention resides in the fact that it is possible to move a vehicle equipped therewith in an uphill direction on a hill without making use of the hand brake, since the device permits a gradual and readily controllable shift from a braking position to an accelerating position, and it will also permit such functions to occur coincidentally or in overlapping relation.

What I claim is:
1. A control pedal system for automobiles which comprises a pivotally mounted brake operating lever having a normally horizontal pivotal axis, a first arm extending downwardly from said axis, a brake operating connection engageable with said arm, and a second arm extending upwardly from said axis, said second arm having a lower portion extending rearwardly from said axis and an upper portion extending upwardly and forwardly from said lower portion, a pedal having a pivot pin pivotally mounting said pedal on said upper portion and having a pivotal axis substantially parallel to said lever axis, said pedal having an upper portion above said pedal axis and a lower portion below said pedal axis, a throttle connection secured to each of said upper and lower portions of said pedal, and means imposing resilient pressure on said pedal to resist pivotal movement of said pedal comprising a spring on said pivot pin in resilient pressure applying relation to said pedal, and a nut on said pivot pin and engaging said spring, said nut being adjustable to adjust pressure of said spring on said pedal.

2. A control pedal system for automobiles which comprises a pivotally mounted brake operating lever having a normally horizontal pivotal axis, a first arm extending downwardly from said axis, a brake operating connection engageable with said arm, and a second arm extending upwardly from said axis, said second arm having a lower portion extending rearwardly from said axis and an upper portion extending upwardly and forwardly from said lower portion, a pedal having a pivot pin pivotally mounting said pedal on said upper portion and having a pivotal axis substantially parallel to said lever axis, said pedal having a heel-engageable section the major portion of which lies below the horizontal plane of said pedal axis, and a forward sole-engageable section lying above the horizontal plane of said pedal axis, throttle operating means, and means for operating said throttle operating means comprising a first flexible connection secured to said heel-engageable section of said throttle operating means, and a second flexible connection secured to said forward sole-engageable section and said throttle operating means, said flexible connections being movable in response to rocking movement of said pedal to operate said throttle operating means.

3. A control pedal system for automobiles as defined in claim 2, said pedal having thereon a transversely extending heel-engaging shoulder defining a line of juncture of said sections of said pedal, and a second heel-engaging shoulder mounted on said heel-engageable section in opposed relation to said first shoulder, said second shoulder being movable towards and away from said first shoulder to adjust the position thereof.

References Cited by the Examiner
UNITED STATES PATENTS

| | | | |
|---|---|---|---|
| 1,520,335 | 12/1924 | Davis | 192—1 |
| 1,868,265 | 7/1932 | White et al. | 192—1 |
| 2,244,116 | 6/1941 | Polonec et al. | 74—560 |
| 2,446,700 | 8/1948 | Giles et al. | |
| 2,542,410 | 2/1951 | Hedges | 192—3 |
| 2,586,111 | 2/1952 | Maurice et al. | 192—3 |

FOREIGN PATENTS 820,725  9/1959  Great Britain.

DAVID J. WILLIAMOWSKY, *Primary Examiner.*